United States Patent [19]

Sugiyama et al.

[11] 4,453,245

[45] Jun. 5, 1984

[54] APPARATUS FOR DETECTING POSITION OF A REPRODUCING TRANSDUCER IN A ROTARY RECORDING MEDIUM REPRODUCING APPARATUS

[75] Inventors: Hiroyuki Sugiyama, Isehara; Masaki Sakurai, Yokohama; Ryuzo Abe, Yokohama; Yasuhiro Yusa, Fujisawa; Kenji Yoshihara, Chiba, all of Japan

[73] Assignee: Victor Company of Japan, Ltd., Yokohama, Japan

[21] Appl. No.: 287,822

[22] Filed: Jul. 28, 1981

[30] Foreign Application Priority Data

Jul. 29, 1980 [JP] Japan .......................... 55-107288[U]

[51] Int. Cl.³ .......................... G11B 3/08; G11B 3/38
[52] U.S. Cl. .................................... 369/230; 369/220; 369/233; 369/243
[58] Field of Search .................. 369/220, 58, 230, 233, 369/243

[56] References Cited

U.S. PATENT DOCUMENTS

| 3,485,332 | 12/1969 | Heim | 369/243 |
|---|---|---|---|
| 3,993,315 | 11/1976 | Hansen et al. | 369/220 |
| 4,135,086 | 1/1979 | Baba | 369/41 |
| 4,322,840 | 3/1982 | Kusaka | 369/220 |

FOREIGN PATENT DOCUMENTS 2023881A 1/1980 United Kingdom .
2050674A 1/1981 United Kingdom .
2062336A 5/1981 United Kingdom .

*Primary Examiner*—Steven L. Stephan
*Attorney, Agent, or Firm*—Louis Bernat

[57] ABSTRACT

An apparatus for detecting position of a reproducing transducer in a rotary recording medium reproducing apparatus which reproduces an information signal recorded in a rotary recording medium by a reproducing transducer which is transferred towards the radial direction of the rotary recording medium, comprises a single photo-detector having a light-emitting element and a light-receiving element, provided in a manner so as to be transferred unitarily with the reproducing transducer, a light interrupting plate provided at a fixed part of the rotary recording medium reproducing apparatus, for operating together with the photo-detector, and a position detection signal producing circuit for producing a position detection output signal according to an output of said photo-detector, to indicate that the reproducing transducer has passed a position corresponding to the outermost peripheral position and the innermost peripheral position of the recorded region in the rotary recording medium. The light interrupting plate has a configuration so as to change state between a light interrupting state and a non-interrupting state with respect to the photo-detector, as the reproducing transducer passes a position corresponding to an outermost peripheral position and an innermost peripheral position of a recorded region in the rotary recording medium.

5 Claims, 6 Drawing Figures

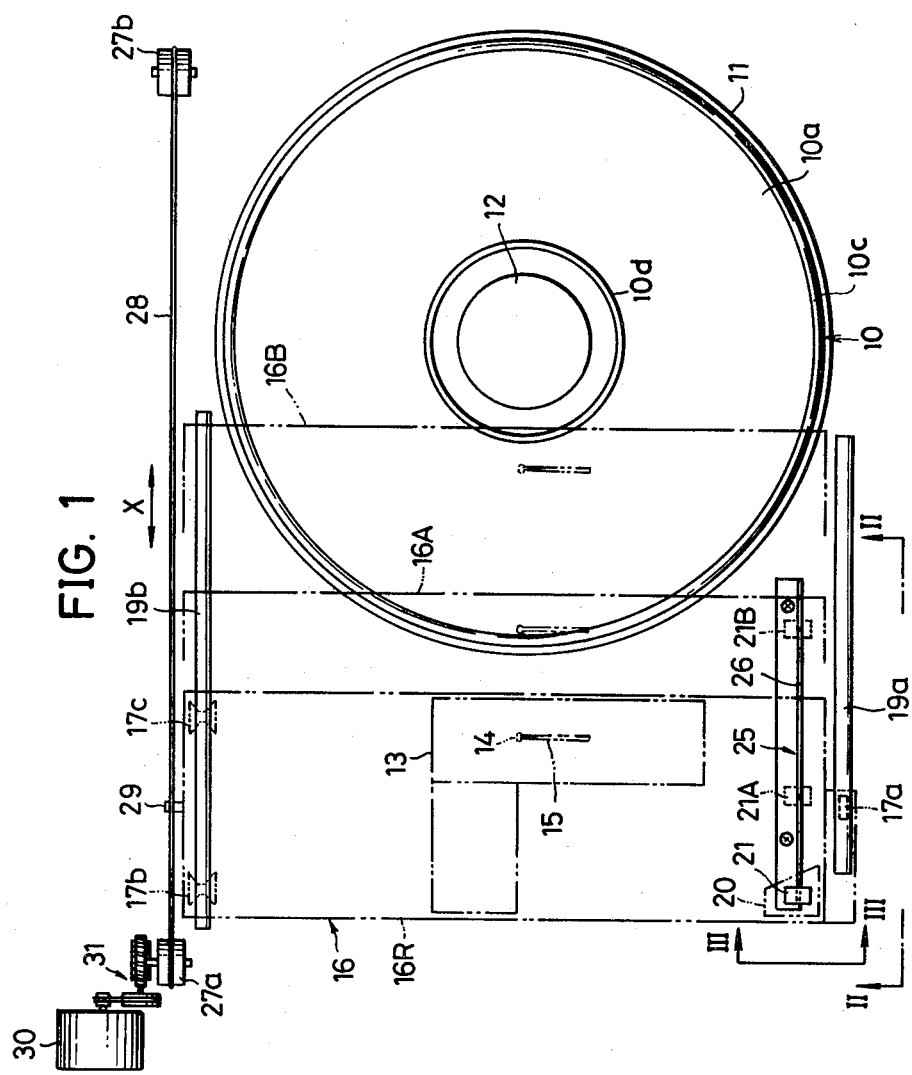

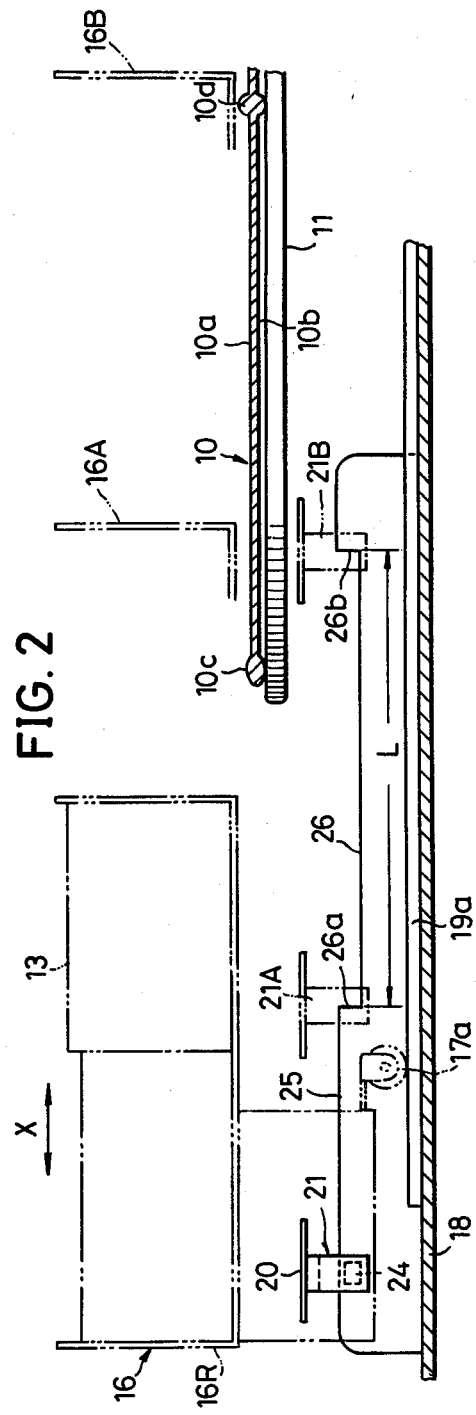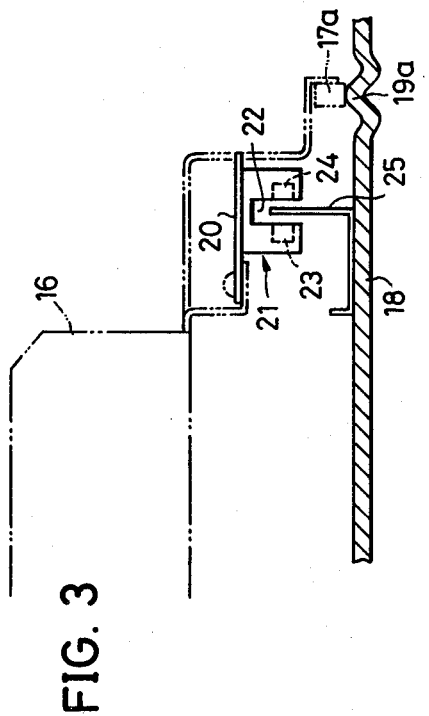

APPARATUS FOR DETECTING POSITION OF A REPRODUCING TRANSDUCER IN A ROTARY RECORDING MEDIUM REPRODUCING APPARATUS

BACKGROUND OF THE INVENTION

The present invention generally relates to apparatuses for detecting positions of reproducing transducers in rotary recording medium reproducing apparatuses, and more particularly to an apparatus for performing detection to detect that a reproducing transducer has reached an outermost peripheral position (lead-in position) and an innermost peripheral position (lead-out position) of a recorded region in a rotary recording medium.

Conventionally, apparatuses for reproducing rotary recording mediums of a so-called electrostatic capacitance type have been reduced into practical use. In this reproducing apparatus, a reproducing stylus makes contact with and slides along a recorded track of the rotary recording medium (hereinafer simply referred to as a disc) in which an information signal such as a video signal is recorded as a variation in geometrical configuration, to reproduce the recorded signal as variations in electrostatic capacitance between the disc and an electrode of the reproducing stylus. In this type of a rotary recording medium reproducing apparatus, a reproducing transducer including the reproducing stylus is transferred along a radial direction of the disc.

On the other hand, the disc is provided with groove guards having a thickness which is thicker than the thickness of the part of the recorded region, at the outermost peripheral edge part and the innermost peripheral part of the disc. Accordingly, when the reproducing transducer is transferred from a resting position to reach the outermost peripheral position (hereinafter referred to as a lead-in position) of the recorded region on the disc upon starting of the reproduction, the reproducing stylus must be in a receded state within the reproducing transducer so that the reproducing stylus does not hit against the groove guard part formed at the outer peripheral edge part of the disc. Furthermore, the reproducing stylus must be lowered to make contact with the disc, when the reproducing transducer reaches the lead-in position of the disc. Moreover, the reproducing stylus must be raised upon completion of the reproduction, when the reproducing stylus reaches the innermost peripheral position (hereinafter referred to as a lead-out position) of the recorded region on the disc.

In addition, it is necessary to perform detection to detect that the reproducing transducer is at a position corresponding to the lead-in position and the lead-out position of the disc, in order to control the transferring speed and the transferring direction of the reproducing transducer and the like, to perform such operations in which the reproducing transducer is transferred from the resting position to the lead-in position at a high speed upon starting of the reproducing, the reproducing transducer is transferred from the lead-in position at a normal reproducing speed, or the transferring direction of the reproducing transducer is reversed at the lead-out position to return the reproducing transducer to the resting position at a high speed, not only to perform operations to lower and raise the above reproducing stylus.

Therefore, conventionally, two switches which are normally open were respectively provided at positions corresponding to the lead-in and lead-out positions of a disc placed onto a turntable, where a projection provided on the reproducing transducer makes contact with and closes the switch when the reproducing transducer reaches the lead-in or lead-out position of the disc. In this conventional apparatus, the construction of the apparatus became complex, and the cost of the apparatus became high, since two switches were required. Further, in the above conventional apparatus, there was a disadvantage in that the transferring direction of the reproducing transducer cannot be detected, although detection can be performed to detect that the reproducing transducer has reached the lead-in or lead-out position of the disc.

The above described switches of the conventional apparatus are constructed to introduce a position detection signal when the switch is closed for a short period of time. Accordingly, in a case where the switch provided at a position corresponding to the lead-out position of the disc breaks down and cannot be put into a closed state, for example, the reproducing stylus is not raised and continues to make contact with the disc, and further, the transferring direction of the reproducing transducer is not reversed. Hence, the reproducing stylus in this state is further transferred towards the inner peripheral direction of the disc, making contact with the disc, and hits against the groove guard at the inner peripheral side. Thus, the reproducing stylus can be damaged to an extent where the reproducing stylus cannot be used again.

SUMMARY OF THE INVENTION

Accordingly, it is a general object of the present invention to provide a novel and useful apparatus for detecting position of a reproducing transducer in a rotary recording medium reproducing apparatus in which the above described disadvantages have been overcome.

Another and more sepecific object of the present invention is to provide an apparatus for detecting position of a reproducing transducer in a rotary recording medium reproducing apparatus having single photo-detection means provided on the reproducing transducer, a light interrupting plate provided at a fixed part of the reproducing apparatus for operating together with the photo-detection means, and a circuit for obtaining a position detection output in response to an output of the light detection means. According to the apparatus of the present invention, the construction of the apparatus is simple, and the apparatus can be manufactured at low cost. Further, detection can be performed to detect the transferring direction of the reproducing transducer. Moreover, the apparatus is constructed to introduce a detection output so as to raise the reproducing stylus, if the photo-detection means should fail to operate upon use, and an accident in which the reproducing stylus is damaged as in the conventional apparatus is accordingly prevented.

Other objects and further features of the present invention will be apparent from the following detailed description when read in conjunction with the accompanying drawings.

BRIEF DESCRIPTION OF THE DRAWINGS

FIG. 1 is a substantial plan view showing a rotary recording medium reproducing apparatus provided with an embodiment of an apparatus for detecting position of a reproducing transducer according to the present invention;

FIG. 2 is an elevation showing the apparatus shown in FIG. 1 viewed from a direction along lines II—II in FIG. 1;

FIG. 3 is an elevation showing the apparatus shown in FIG. 1 viewed from a direction along lines III—III in FIG. 1;

DETAILED DESCRIPTION

Figure 4:
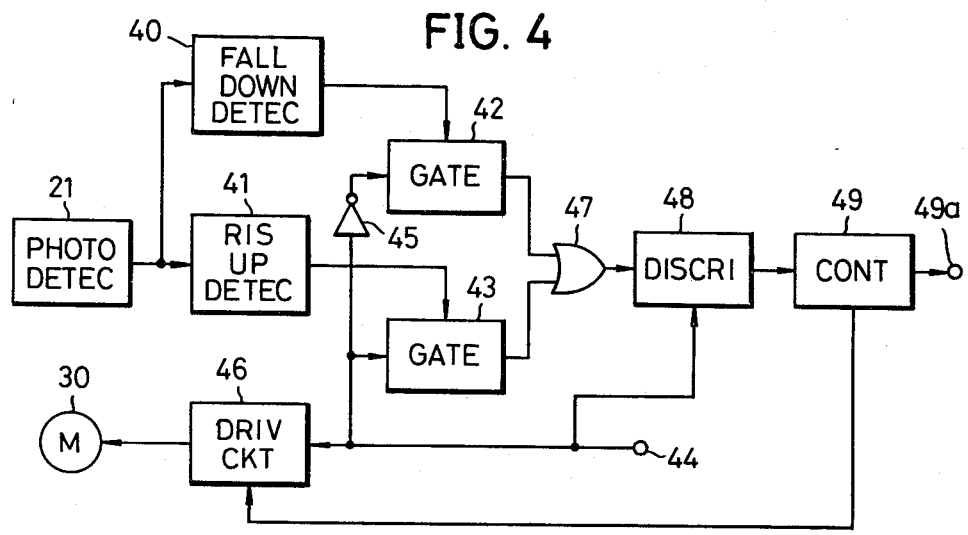
FIG. 4 is a systematic block diagram showing an embodiment of a position detection circuit in an apparatus for detecting position of a reproducing transducer according to the present invention.

In FIGS. 1 through 3, a disc 10 is placed on a turntable 11, and clamped by a clamper 12. The disc 10 is rotated at a rotational speed of 900 rpm, for example. Further, groove guards 10c and 10d are respectively provided at an outermost peripheral edge part and an innermost peripheral part of the disc 10, so that recorded regions 10a and 10b of the disc 10 do not make contact with the turntable 11. An information signal such as a video signal and an audio signal is recorded in the recorded regions 10a and 10b.

A reproducing transducer 13 comprises a pickup device including a cantilever 15 provided with a reproducing stylus 14, a resonator (not shown), and the like, and is mounted to a carriage 16. The carriage 16 has flange parts provided unitarily at both sides thereof, and the flanges have freely rotatable rollers 17a, 17b, and 17c. The roller 17a rolls over a rail 19a provided on a chasis 18 of the reproducing apparatus, and the rollers 17b and 17c respectively roll over a rail 19b. Accordingly, the carriage 16 moves in the direction of an arrow X.

A photo-detector 21 is mounted and supported on a lower surface of a support plate 20 which is mounted at a predetermined position of the carriage 16. The photo-detector 21 has a groove 22 formed at the center thereof, and a light-emitting element 23 and a light-receiving element 24 are respectively provided on leg portions of the photo-detector 21. These light-emitting element 23 and light-receiving element 24 are respectively provided at opposing positions, having the groove 22 therebetween.

A light interrupting plate 25 extends along the direction of the arrow X, at a position on the chasis 18 so as to enter within the groove 22 of the photo-detector 21. The light interrupting plate 25 is provided at a height position between the light-emitting element 23 and the light-receiving element 24 of the photo-detector 21, and is provided with a cutout part 26 extending for a predetermined interval L which corresponds to the length of the recorded regions 10a and 10b along the radial direction of the disc 10, where the cutout part 26 has a height position which is not between the light-emitting element 23 and the light-receiving element 24 of the photo-detector 21.

A belt or a wire 28 is provided across pulleys 27a and 27b. A projection 29 of the carriage 16 is fixedly provided at a part of the wire 28. The rotation of a motor 30 is transmitted to the pulley 27a through a rotation transmitting mechanism 31 including a worm and a worm gear. Accordingly, the pulley 27a rotates as the motor 30 rotates, and the wire 28 is accordingly transferred towards the direction of the arrow X. Hence, the carriage 16 is also transferred towards the direction of the arrow X.

In a state before starting of the reproduction, the carriage 16 is at a resting position indicated by 16R, and is in a state receded from above the turntable 11. In this state, the light interrupting plate 25 lies between the light-emitting element 23 and the light-receiving element 24 of the photo-detector 21, and thus, the light from the light-emitting element 23 does not reach the light-receiving element 24.

When a play operation is performed in the above state, a high-level signal is applied to a terminal 44 in FIG. 4 as a forward signal. This forward signal is applied to the motor 30 through a motor driving circuit 46, to rotate the motor 30 in a positive direction. The voltage applied to the motor 30 at this point is a high voltage, and the motor 30 is accordingly rotated at a high speed. Hence, the carriage 16 is moved towards the right direction in FIGS. 1 and 2 from the resting position 16R at a high speed.

When the transferred carriage 16 reaches a position where the reproducing stylus 14 is at a position at the outermost peripheral part of the recorded region 10a after moving over the groove guard 10c of the disc 10, that is, when the reproducing stylus 14 reaches a position indicated by 16A in FIGS. 1 and 2 opposing the lead-in position of the disc 10, the photo-detector 21 reaches a position indicated by 21A opposing a left end edge 26a of the cutout part 26 in the light interrupting plate 25.

The moment the photo-detector 21 moves over the left end edge 26a to the right hand side thereof, the light emitted from the light-emitting element 23 reaches the light-receiving element 24 without being interrupted by the light interrupting plate 25. Hence, the output level of the light-receiving element 24, that is, the output level of the photo-detector 21 changes and falls down to low level from a high level. The falling down in the output level of the photo-detector 21 is detected by a falling down detector 40, and the detected output pulse of this falling down detector 40 is supplied to a gate circuit 42. At this point in time, a low-level signal obtained by passing a high-level signal from the terminal 44 through an inverter 45, passes through the gate circuit 42, and is supplied to a discriminating circuit 48 through an OR-gate 47.

The discriminating circuit 48 is also supplied with a forward instruction signal obtained though the terminal 44. Since the signal from the terminal 44 is of high level and the signal from the OR-gate 47 is of low level, the discriminating circuit 48 discriminates that the photo-detector 21 has reached a position at the left end edge of the cutout part 26, that is, that the reproducing stylus 14 has reached a position opposing the lead-in position of the disc 10, and accordingly produces a discrimination signal which indicates that the reproducing stylus 14 has reached the lead-in position in the forward direction. This discrimination signal thus produced by the discriminating circuit 48 is supplied to a control circuit 49.

Figure 5:
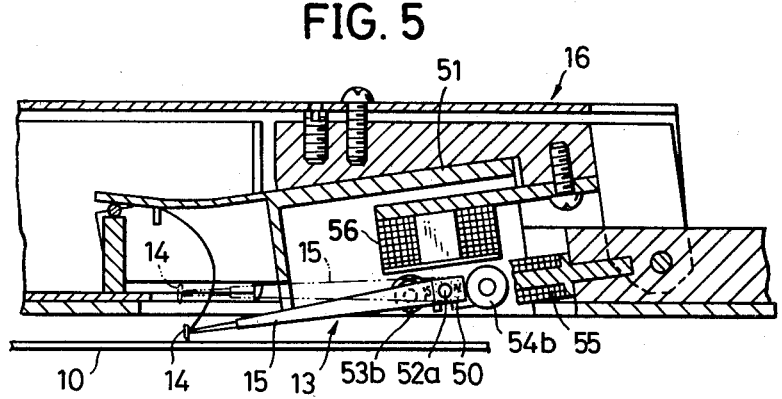
FIGS. 5 and 6 respectively are a side view showing a vertical cross section and a plan view showing a horizontal cross section of an example of a reproducing transducer.

The control circuit 49 supplies a current, that is, a stylus lowering signal to the reproducing transducer shown in FIG. 5 through an output terminal 49a, according to the above discrimination signal. The control circuit 49 also controls the motor driving circuit 46, to set the rotational speed of the motor 30 in the positive direction to a normal speed. Hence, the carriage 16 is thereafter transferred towards the right hand direction at the normal reproducing speed.

Figure 6:
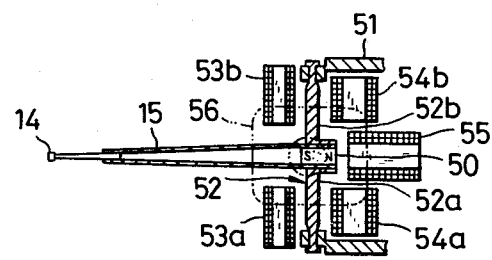

The reproducing transducer 13 has a construction as shown in FIGS. 5 and 6. A permanent magnet piece 50 having a columnar shape is fixedly inserted into the rear end of the cantilever 15 along the longitudinal direction thereof. The rear end side of the cantilever 15 is held between a pair of arm portions 52a and 52b of a suspension 52 made of rubber, where the suspension 52 is fixed to a casing 51. The suspension 52 is mounted in a manner such that the reproducing stylus 14 is in a drawn in state within the casing 51. Two pairs of coils 54a, 54b, 53a, and 53b for tracking control are respectively provided opposing each other on the right and left sides of the permanent magnet piece 50. Further, a coil 55 for jitter compensation and a coil 56 for raising the stylus, are respectively provided opposing each other at the rear part and at the upper part of the permanent magnet piece 50. The center of the coil 56 is shifted towards the left from the above arm portions 52a and 52b as shown in FIG. 6, and the coil 56 is provided in a manner so as to oppose the S-pole of the permanent magnet piece 50.

When no current is supplied to the coil 56, the cantilever 15 lies in a horizontal state as indicated by a two-dot chain line in FIG. 5, due to the action of the suspension 52. Accordingly, the reproducing stylus 14 is raised, and is at a height position where the reproducing stylus 14 does not make contact with the disc 10.

When the carriage 16 is transferred in a manner described above, and the reproducing stylus 14 reaches a position opposing the lead-in position of the disc 10, a current is supplied to the coil 56 according to the stylus lowering signal from the control circuit 49, so that the lower side of the coil 56 becomes the S-pole. Hence, a rotational force in the counter clockwise direction in FIG. 5 is introduced to the permanent magnet piece 50. Accordingly, the cantilever 15 rotates towards the counter clockwise direction to a position indicated by a solid line in FIG. 5, accompanied by the deformation in the arm portions 52a and 52b of the suspension 52. Therefore, the reproducing stylus 14 makes contact with the disc 10, and a predetermined stylus pressure is applied to the reproducing stylus 14.

As the carriage 16 is transferred towards the forward direction, the recorded signals at the recorded region 10a of the disc 10 is reproduced by the reproducing stylus 14.

When the reproducing stylus 14 finishes reproducing all of the recorded region 10a of the disc 10, to slightly pass the innermost peripheral position of the disc 10, and the carriage 16 reaches a position indicated by 16B in FIGS. 1 and 2, the photo-detector 21 reaches a position indicated by 21B opposing a right end edge 26b of the cutout part 26 in the light interrupting plate 25.

The moment the photo-detector 21 passes the right end edge 26b to the right hand side thereof, the light emitted from the light-emitting element 23 is interrupted by the light interrupting plate 25, and the light does not reach the light-receiving element 24. Hence, the output level of the light-receiving element 24, that is, the output level of the photo-detector 21 changes and rises up to a high level from a low level. The rising up in the output level of the photo-detector 21 is detected at a rising up detector 41, and the detection pulse of the rising up detector 41 is supplied to a gate circuit 43. Accordingly, the high-level signal from the terminal 44 passes through the gate circuit 43, and is supplied to the discriminating circuit 48 through the OR-gate 47. The discriminating circuit 48 discriminates that the photo-detector 21 has reached the right end edge position of the cutout 26, that is, that the reproducing stylus 14 has reached a position opposing the lead-out position of the disc 10, from the high-level signals supplied from the terminal 44 and the OR-gate 47. Thus, the discriminating circuit 48 produces and supplies a discrimination signal to the control circuit 49.

The control circuit 49 interrupts the application of the current, that is, the stylus lowering signal, to the terminal 49a according to the above discrimination signal supplied from the discriminating circuit 48. Therefore, no current is applied to the coil 56, and the cantilever 15 returns to the position indicated by the two-dot chain line in FIG. 5 due to the returning force exerted by the suspension 52. Thus, the reproducing stylus 14 is raised.

According to a program of mode which is pre-established, the above control circuit 49 is supplied with a lead-out discrimination signal from the discriminating circuit 48, and for example, the control circuit 49 applies a low-level signal to the terminal 44 as a backward signal. The motor driving circuit 46 thus rotates the motor 30 in the reverse direction, and the carriage 16 is transferred towards the left hand side in FIGS. 1 and 2. In a case where the program of mode pre-established in the control circuit 49 is a mode to finish the reproducing operation after performing reproduction to the lead-out position of the disc 10, the carriage 16 is transferred at a high speed to the resting position 16R.

In a case where the carriage 16 is transferred towards the left hand side, the circuit shown in FIG. 4 is operated in a similar manner when the detection signal for the lead-in and lead-out positions are used. When the photo-detector 21 is transferred towards the left hand side from a position at the right of the position 21B to pass the position 21B, the output level of the photo-detector 21 falls down. Accordingly, this falling down in the output level of the photo-detector 21 is detected at the fall down detector 40, and a signal converted into high level through the inverter 45 is supplied to the discriminating circuit 48 through the gate circuit 42 and the OR-gate 47. The discriminating circuit 48 is also supplied with a low-level signal from the terminal 44. Hence, the discriminating circuit 48 discriminates that the reproducing stylus 14 has reached a position opposing the lead-out position of the disc 10, from the above low-level signal from the terminal 44 and the high-level signal from the OR-gate 47.

When the carriage 16 is transferred further towards the left hand side and the photo-detector 21 passes the position 21A, the output level of the photo-detector 21 rises up. Accordingly, the rising up in the output level of the photo-detector 21 is detected at the rising up detector 41, and the low-level signal from the terminal 44 is supplied to the discriminating circuit 48 through the gate circuit 43 and the OR-gate 47. Thus, the discriminating circuit 48 discriminates that the reproducing stylus 14 has reached a position opposing the lead-in position of the disc 10, from the low-level signals from the terminal 44 and the OR-gate 47.

The above operation to detect the lead-in and lead-out positions of the disc 10 can be performed by constructing the apparatus so that a light interrupting plate having a height position to interrupt the light from the light-emitting element 23 of the photo-detector 21 extends only for the above predetermined interval L and does not extend elsewhere, instead of using the above described light interrupting plate 25. However, in a case where the light-emitting element 23 breaks down and does not emit light, for example, the state in this case becomes the same as when the light from the light-emitting element is interrupted by the light interrupting plate. Thus, there are cases where the reproducing stylus 14 is lowered, although the reproducing stylus is actually outside the recorded region 10a of the disc 10. Accordingly, the above described embodiment of the invention is preferable in that an accident of the above described type is not introduced even when the photodetector 21 breaks down, due to the configuration of the light interrupting plate 25.

The use of the above output signal of the discriminating circuit 48 is not limited to the above described usage, and can be used for other applications.

Further, this invention is not limited to these embodiments but various variations and modifications may be made without departing from the scope of the invention.

What is claimed is:

1. An apparatus for detecting the position of a reproducing transducer in a reproducing apparatus which reproduces an information signal recorded on a rotary recording medium, the reproducing transducer being transferred in the radial direction across said rotary recording medium, said apparatus for detecting the position of a reproducing transducer comprising:

single photo-detection means having a light-emitting element and a light-receiving element which are transferred unitarily with said reproducing transducer;

light interrupting plate means located at a fixed part of said rotary recording medium reproducing apparatus, for operating together with said photo-detection means, said light interrupting plate means having a configuration to change its state between a light interrupting state and a non-interrupting state with respect to said photo-detection means, as said reproducing transducer passes positions corresponding to an outermost peripheral position and an innermost peripheral position of a recorded region on said rotary recording medium; and position detection signal producing circuit means for producing a position detection output signal responsive to an output of said photo-detection means, to indicate that said reproducing transducer has passed positions corresponding to the outermost peripheral position and the innermost peripheral position of the recorded region on said rotary recording medium, said light interrupting plate means being a unitary structure for continuously assuming its light interrupting state at first and second end parts thereof respectively corresponding to said outermost and innermost peripheral positions on said rotary recording medium and for assuming its non-interrupting state at positions between said first and second end parts thereof, said first end part of said light interrupting plate extending away from said rotary recording medium, said second end part of said light interrupting plate extending toward said rotary recording medium, said reproducing transducer having a reproducing stylus which is lowered during a reproducing mode of said reproducing apparatus to make a sliding contact with said rotary recording medium and to reproduce the recorded information signal from said rotary recording medium, said reproducing stylus being lowered responsive to the output of said photo-detection means only while said light-receiving element receives the light emitted from said light-emitting element.

2. An apparatus for detecting position of a reproducing transducer as claimed in claim 1 in which said rotary recording medium reproducing apparatus further has a chasis, a carriage provided with said reproducing transducer, and transferring means for linearly transferring said carriage, said photo-detection means is mounted at the lower surface of said carriage and has a main body having a pair of leg portions with a groove formed therebetween, said light-emitting element and said light-receiving element being provided at opposing positions on the pair of legs of said main body with the groove lying therebetween, and said light interrupting plate means is mounted to the chasis of said rotary recording medium reproducing apparatus at a position entering the groove of the main body of said photo-detection means, extending in a direction parallel to the transferring direction of said carriage.

3. An apparatus for detecting the position of a reproducing transducer as claimed in claim 1 in which said reproducing transducer has lowering and raising means for lowering and raising said reproducing stylus, and said position detection signal producing circuit produces and supplies a signal to lower said reproducing stylus to said lowering and raising means when said reproducing stylus reaches a position corresponding to the outermost peripheral position of the recorded region in said rotary recording medium from a position outside said outermost peripheral position, and produces and supplies a signal to raise said reproducing stylus to said lowering and raising means when said reproducing stylus reaches a position corresponding to the innermost peripheral position of the recorded region of said rotary recording medium from a position within said recorded region.

4. An apparatus for detecting the position of a reproducing transducer as claimed in claim 1 in which said reproducing transducer has holding means for holding said reproducing stylus at a raised position, and lowering means for operating and lowering said reproducing stylus against a raising and holding force exerted by said holding means, and said position detection signal producing circuit produces and supplies a signal to lower said reproducing stylus to said lowering means when said reproducing stylus reaches a position corresponding to the outermost peripheral position of the recorded region in said rotary recording medium from a position outside said outermost peripheral position, and interrupts the supply of the signal to lower said reproducing stylus to said lowering means when said reproducing stylus reaches a position corresponding to the innermost peripheral position of the recorded region of said rotary recording medium from a position within said recorded region.

5. An apparatus for detecting position of a reproducing transducer as claimed in claim 1 in which said position detection signal producing circuit produces the position detection output signal from change in the output of said photo-detection means respective of change in state between the light interrupting state and the non-interrupting state of said light interrupting plate means with respect to said photo-detection means, and from a signal respective of the transferring direction of said reproducing transducer.

* * * * *